United States Patent
Ramirez Llanos et al.

(10) Patent No.: US 12,055,944 B2
(45) Date of Patent: Aug. 6, 2024

(54) METHOD FOR DETERMINING A TOW HITCH POSITION

(71) Applicant: Continental Automotive Systems, Inc., Auburn Hills, MI (US)

(72) Inventors: Eduardo Jose Ramirez Llanos, Auburn Hills, MI (US); Xin Yu, Rochester Hills, MI (US); Matthew Berkemeier, Beverly Hills, MI (US)

(73) Assignee: Continental Autonomous Mobility US, LLC, Auburn Hills, MI (US)

( * ) Notice: Subject to any disclaimer, the term of this patent is extended or adjusted under 35 U.S.C. 154(b) by 69 days.

(21) Appl. No.: 17/116,670

(22) Filed: Dec. 9, 2020

(65) Prior Publication Data
US 2022/0179429 A1   Jun. 9, 2022

(51) Int. Cl.
G05D 1/00   (2024.01)
B60D 1/06   (2006.01)
B60D 1/36   (2006.01)
B60W 50/14  (2020.01)

(52) U.S. Cl.
CPC ............ G05D 1/0246 (2013.01); B60D 1/065 (2013.01); B60D 1/36 (2013.01); B60W 50/14 (2013.01); B60W 2420/403 (2013.01)

(58) Field of Classification Search
CPC ........ G05D 1/0246; B60D 1/065; B60D 1/36; B60W 50/14; B60W 2420/42
USPC ......................................................... 701/28
See application file for complete search history.

(56) References Cited

U.S. PATENT DOCUMENTS

| | | | |
|---|---|---|---|
| 10,906,583 B2 * | 2/2021 | Li | B62D 13/06 |
| 2018/0081370 A1 | 3/2018 | Miller | |
| 2019/0366929 A1 | 12/2019 | Maruoka et al. | |
| 2020/0079165 A1 * | 3/2020 | Niewiadomski | G05D 1/0246 |
| 2020/0160616 A1 * | 5/2020 | Li | G06N 3/0454 |
| 2020/0175311 A1 | 6/2020 | Xu | |
| 2020/0302160 A1 * | 9/2020 | Hashimoto | G06T 7/73 |
| 2020/0388071 A1 * | 12/2020 | Grabner | G06T 17/00 |

OTHER PUBLICATIONS

Christian Fuchs, "Kamerabasierte Assistenz für Nutzfahrzeuge", Universität Koblenz• Landau pp. 1-213, XP055911853, URL:https://kola.opus.hbz-nrw.de/opus45-kola/frontdoor/deliver/index/docId/2050/file/Dissertation_Christian_Fuchs.pdf.
European Search Report dated Apr. 26, 2022 for the counterpart European Patent Application No. 21210358.4.
European Examination Report dated Oct. 2, 2023 for the counterpart European Patent Application No. 21210358.4.

* cited by examiner

*Primary Examiner* — Tiffany P Young

(57) ABSTRACT

A method of determining a tow hitch position. The method includes obtaining a two-dimensional image of a tow hitch in a three-dimensional scene. A model tow hitch is obtained in three dimensions. A three-dimensional rendering of a scene is generated that includes the model tow hitch. The model tow hitch in the three-dimensional rendering is positioned in an orientation corresponding with an orientation of the tow hitch in the three-dimensional scene.

23 Claims, 4 Drawing Sheets

METHOD FOR DETERMINING A TOW HITCH POSITION

BACKGROUND

The present disclosure relates to a trailer hitch assist system. Trailer hitch assist systems are designed to support the driver in coupling a trailer to a vehicle. The tow hitch is a point on the vehicle at which the trailer pivots around as it moves. The tow hitch includes a tow ball, or other form of attachment, that is generally attached to a receiver on a rear of a vehicle.

Trailer hitch assist systems require information about the orientation and the position of tow hitch mounted on the vehicle. Trailer hitch assist systems may also need information about the position of the tow hitch in relation to a position of a camera on the vehicle.

The tow hitch positions may be measured manually, but this approach can lead to inaccuracies, is costly, and time consuming. This is especially true when the tow coupling is not mounted during the manufacturing of the vehicle or in cases where the tow coupling can be moved manually or electronically on the vehicle. There is a desire to improve the accuracy and simplicity of determining a position of the tow hitch in relation to the vehicle.

SUMMARY

In one exemplary embodiment, a method of determining a tow hitch position. The method includes obtaining a two-dimensional image of a tow hitch in a three-dimensional scene. A model tow hitch is obtained in three dimensions. A three-dimensional rendering of a scene is generated that includes the model tow hitch. The model tow hitch in the three-dimensional rendering is positioned in an orientation corresponding with an orientation of the tow hitch in the three-dimensional scene.

In a further embodiment of any of the above, the model tow hitch corresponds to the tow hitch.

In a further embodiment of any of the above, the model tow hitch and the tow hitch include at least one of a matching tow hitch drop, a ball diameter, or a distance from a receiver.

In a further embodiment of any of the above, the two-dimensional image of the tow hitch is captured by a camera mounted to a vehicle.

In a further embodiment of any of the above, obtaining the model tow hitch in three dimensions includes selecting the model tow hitch from a database of predefined tow hitches.

In a further embodiment of any of the above, selecting the model tow hitch from the database includes comparing the two-dimensional image of the tow hitch with invariant features of predefined tow hitches in the database.

In a further embodiment of any of the above, the invariant features from the database of predefined tow hitches are identified through a classification algorithm.

In a further embodiment of any of the above, obtaining the model tow hitch in three-dimensions includes receiving inputs directed to design parameters for generating the model of the tow hitch in three dimensions.

In a further embodiment of any of the above, generating the three-dimensional rendering includes utilizing at least one of camera extrinsic data, camera intrinsic data, a plane of a ground segment, or the model tow hitch.

In a further embodiment of any of the above, the three-dimensional rendering identifies a model camera focal point that corresponds in three-dimensional space to a focal point of the camera used for obtaining the two-dimensional image of the tow hitch.

In a further embodiment of any of the above, positioning the model tow hitch includes generating a two-dimensional projection of the model tow hitch from the model camera focal point and comparing the two-dimensional projection with the two-dimensional image.

In a further embodiment of any of the above, the model tow hitch is properly positioned when the two-dimensional projection of the model tow hitch matches the two-dimensional image of the tow hitch.

In another exemplary embodiment, a trailer hitch assisting assembly includes a camera for capturing images of a tow hitch. A controller is configured to obtain a two-dimensional image of a tow hitch in a three-dimensional scene. A model tow hitch is obtained in three dimensions. A three-dimensional rendering of a scene is generated that includes the model tow hitch. The model tow hitch in the three-dimensional rendering is positioned in an orientation corresponding with an orientation of the tow hitch in the three-dimensional scene.

In a further embodiment of any of the above, the model tow hitch and the tow hitch include at least one of a matching tow hitch drop, a ball diameter, or a distance from a receiver.

In a further embodiment of any of the above, the two-dimensional image of the tow hitch is captured by a camera mounted to a vehicle.

In a further embodiment of any of the above, obtaining the model tow hitch in three dimensions includes selecting the model tow hitch from a database of predefined tow hitches. Selecting the model tow hitch from the database includes comparing the two-dimensional image of the tow hitch with invariant features of predefined tow hitches in the database.

In a further embodiment of any of the above, the invariant features from the database of predefined tow hitches include at least one of histogram of oriented gradients, Color Names, RGB, or grayscale that characterize the predefined tow hitches.

In a further embodiment of any of the above, generating the three-dimensional rendering includes utilizing at least one of camera extrinsic data, camera intrinsic data, a plane of a ground segment, or the model tow hitch.

In a further embodiment of any of the above, the three-dimensional rendering identifies a model camera focal point that corresponds in three-dimensional space to a focal point of the camera used for obtaining the two-dimensional image of the tow hitch.

In a further embodiment of any of the above, positioning the model tow hitch includes generating a two-dimensional projection of the model tow hitch from the model camera focal point. The two-dimensional projection is compared with the two-dimensional image. The model tow hitch is properly positioned when the two-dimensional projection of the model tow hitch matches the two-dimensional image of the tow hitch.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
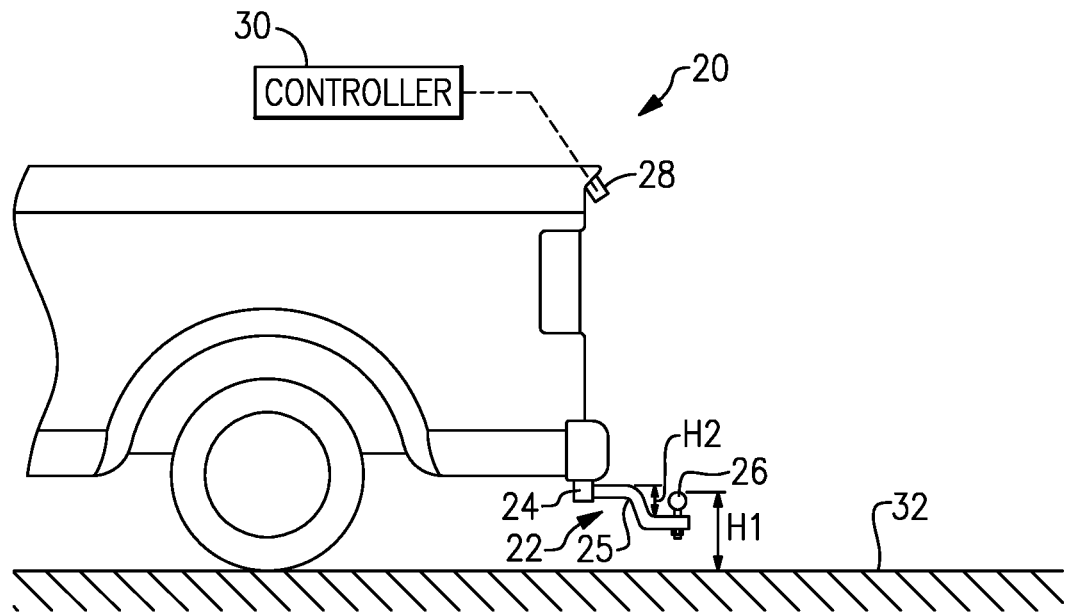
FIG. 1 illustrates an example vehicle having a receiver for accepting a tow hitch.

It is common today for vehicles 20 to include a tow hitch 22 that is fixed relative to the vehicle 20 by a receiver 24. In the illustrated example shown in FIG. 1, the tow hitch 22 includes a ball mount 25 for supporting a ball 26 adjacent a first end and attaching to the receiver 24 adjacent a second end. The ball mount 25 is removeable and attached to the receiver 24 and not retained by a pin. The ball 26 on the tow hitch 22 is used to form a connection with a trailer (not shown) to allow the trailer to rotate around the ball 26 while maneuvering the vehicle 20, particularly when turning or reversing the vehicle 20 when attached to the trailer.

The vehicle 20 also includes a camera 28 for obtaining images 40 (See FIG. 2) of the rear of the vehicle 20 including the tow hitch 22. The images can be projected on a display to users for assisting in viewing a rear of the vehicle 20 and a surrounding area. A controller 30 is located on the vehicle 20 and is in electrical communication with the camera 28 to capture, store, and/or process images from the point of view of the camera 28. The controller 30 includes a processor in electrical communication with memory for performing these steps and the ones outlined further below. The controller 30 can also include further inputs and outputs to for communicating with other parts of the vehicle 20.

In the illustrated example, the vehicle 20 is located on a flat ground segment 32, such that a top of the ball 26 is located a height H1 above the ground segment 32. The tow hitch 22 also includes a drop in the ball mount 25. The drop is defined by a height H2 between an upper surface of the ball mount 25 adjacent the receiver and an upper surface of the ball mount 25 adjacent the ball 26. The drop of the tow hitch 22 contributes to the change in height H1 of the ball 26 above the ground segment 32. While the illustrated example shows the drop H1 positioning the ball 26 closer to the ground segment 32 relative to the receiver 24, there may be applications where the drop H1 positions the ball 26 further away from the ground segment 32 (FIG. 6) to accommodate different trailer attachment heights.

While an image of the tow hitch 22 is visible to a user of the vehicle 20 on a display through the camera 28, the image provides limited information to the user. For example, the image cannot provide a dimension for the drop height H1, a diameter of the ball 26, or a distance of the ball 26 from the receiver 24 on the vehicle 20. Therefore, one feature of this disclosure is to provide more information regarding the tow hitch 22 to a user or vehicle systems than cannot be obtained simply by looking at the tow hitch 22 with the camera 28.

Figure 2:
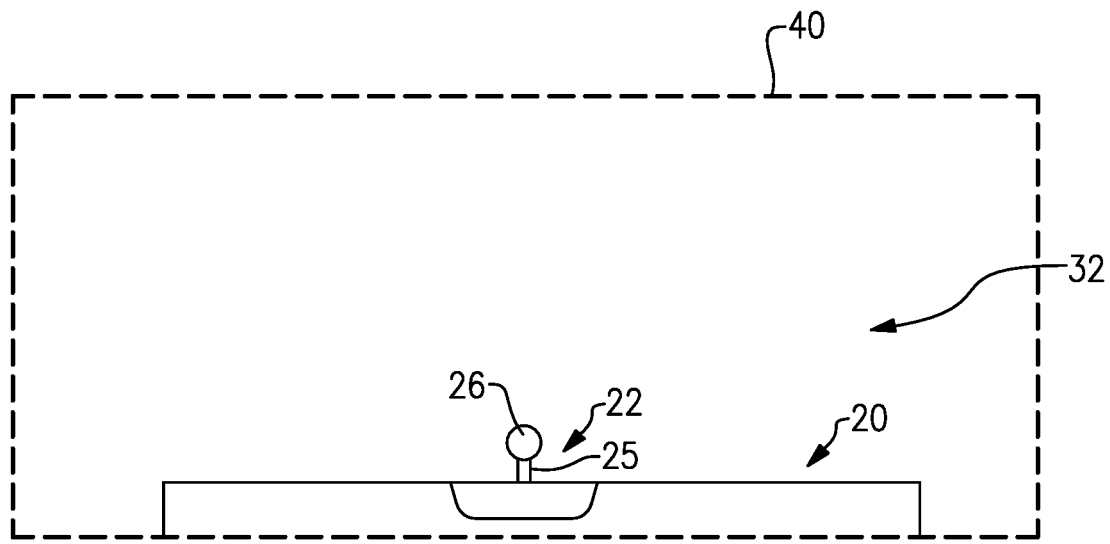
FIG. 2 illustrates an example image of the tow hitch taken by a camera on the vehicle of FIG. 1.
Figure 3:
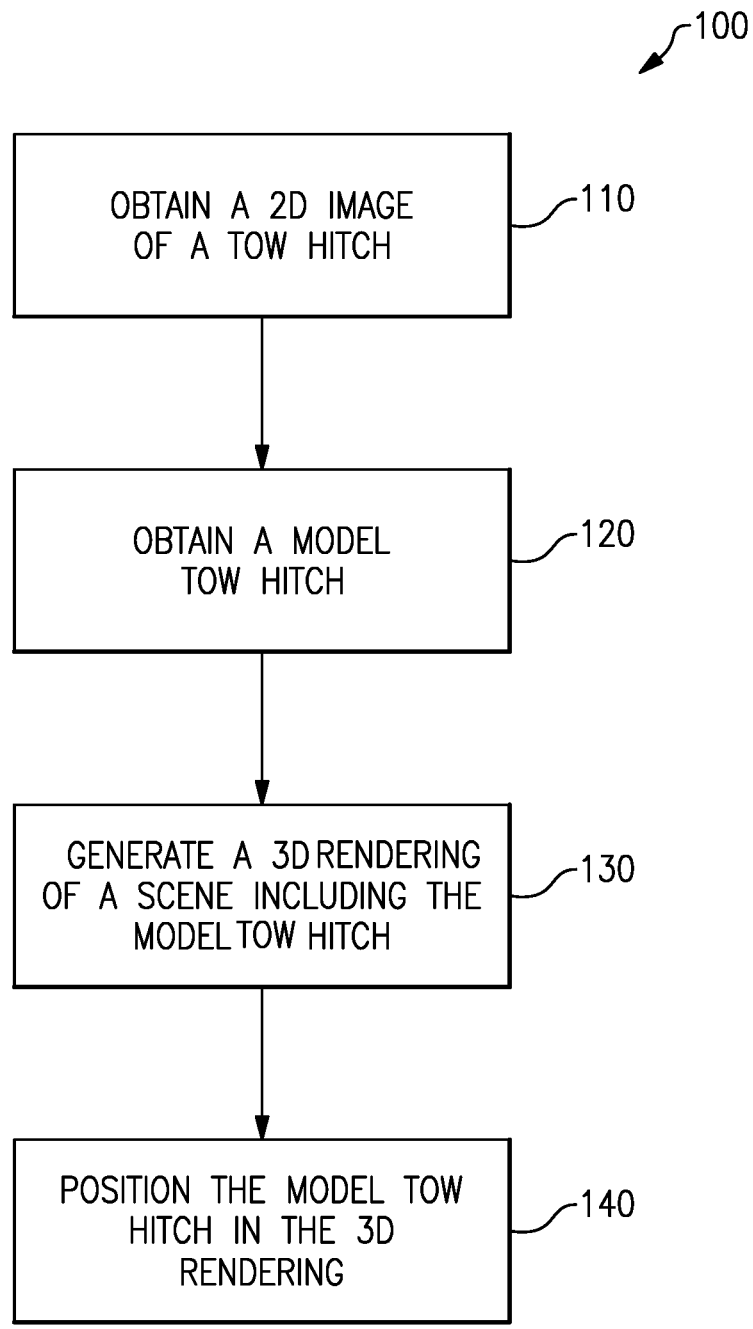
FIG. 3 illustrates a method of determining a position of a tow hitch.
Figure 4:
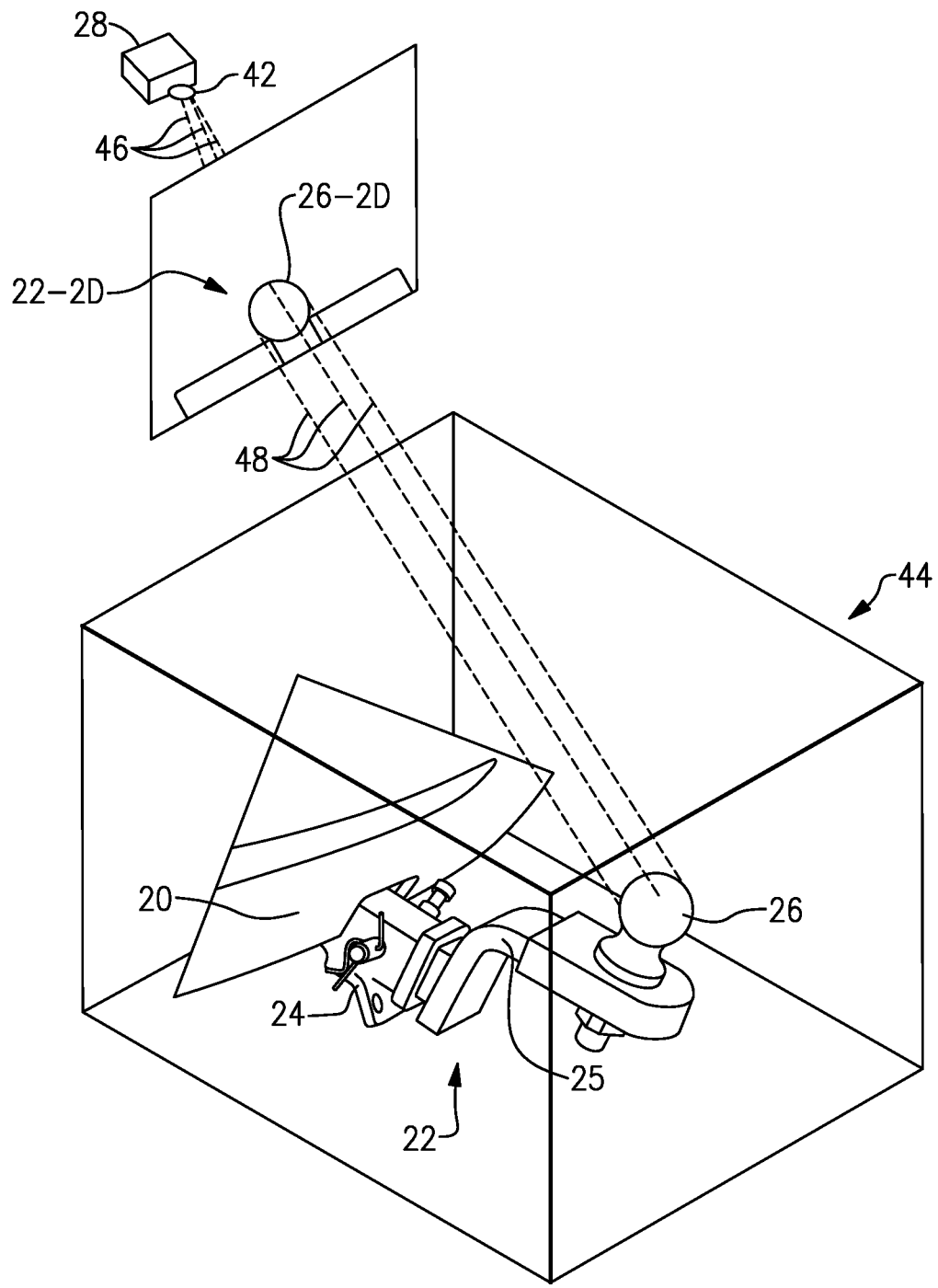
FIG. 4 illustrates capturing a two-dimensional image of the tow hitch from a three-dimensional scene.

FIG. 3 illustrates an example method 100 of providing additional information to a user regarding the tow hitch 22 through the use of the camera 28. At step 110, the controller 30 utilizes the camera 28 to obtain a two-dimensional image 40 of the tow hitch 22 (FIGS. 2 and 4). The camera 28 includes a focal point 42 for collecting the image 40. As shown in FIG. 4, the two-dimensional image 40 captured by the camera 28 is representative of the tow hitch 22 attached to the vehicle 20 in a three-dimensional scene 44 where the vehicle 20 and tow hitch 22 are located. Additionally, FIG. 4 illustrates focal lead lines 46 extending from the focal point 42 to a two-dimensional ball 26-2D on a two-dimensional tow hitch 22-2D in the two-dimensional image 40. Furthermore, corresponding lines 48 match the two-dimensional ball 26-2D in two-dimensional space with the ball 26 in the three-dimensional scene 44.

Figure 5:
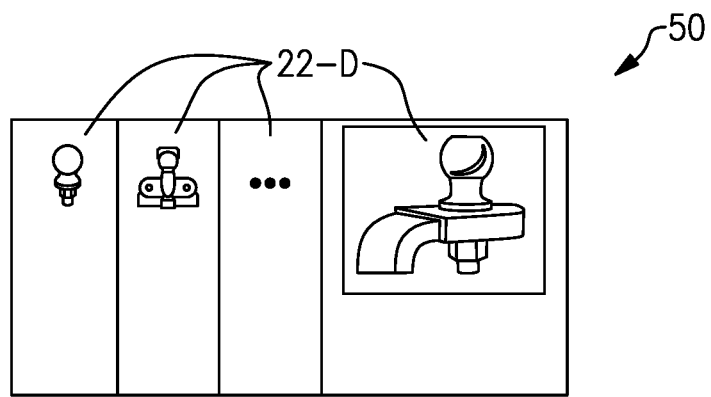
FIG. 5 illustrates a database of tow hitches having known characteristics.

Once the two-dimensional image 40 of the tow hitch 22 with the ball 26 has been taken, the controller 30 utilizes that image 40 to identify the tow hitch 22 from a database 50 (FIG. 5) of tow hitches 22. The database 50 of tow hitches includes predefined information of multiple tow hitches 22.

The controller 30 identifies the tow hitch 22 by comparing the two-dimensional image 40 of the tow hitch 22 taken by the camera 28 to the database 50 (FIG. 5) having the predefined information about known tow hitches 22-D. The comparison can be performed by a classification algorithm trained to identify the specific tow hitch 22. For example, the classification algorithm could include a neural network, a deep learning approach, or another classical approach. In one example, the database 50 includes two-dimensional images of the known tow hitches 22-D with diameters of the ball 26, a distance of the ball 26 from the receiver, and a drop H2. The database 50 may also include predetermined parameters, such as dimensions, of the known tow hitches 22-D to compare to parameters taken from the two-dimensional image 40 of the tow hitch 22.

Alternatively, the database 50 includes invariant features, such as histogram of oriented gradients ("HOG"), Color Names, RGB, and/or grayscale, to characterize the known tow hitches 22-D. The controller 30 utilizes the invariant features of the known tow hitches 22-D to compare to features of the tow hitch 22 from the image 40 to match with one of the known tow hitches 22-D from the database 50. The controller 30 may also select one of the known tow hitches 22-D if the differences between the tow hitch 22 and the known tow hitches 22-D in the database 50 are within a predetermined amount of error.

Furthermore, the user can select one of the known tow hitch 22-D from the database 50 that matches the tow hitch 22 or insert parameters defining the tow hitch 22, such as drop, ball size, and/or distance from the receiver 24, in order for the controller 30 to have the needed parameters to define the tow hitch 22 in a three-dimensional rendering 60.

Figure 6:
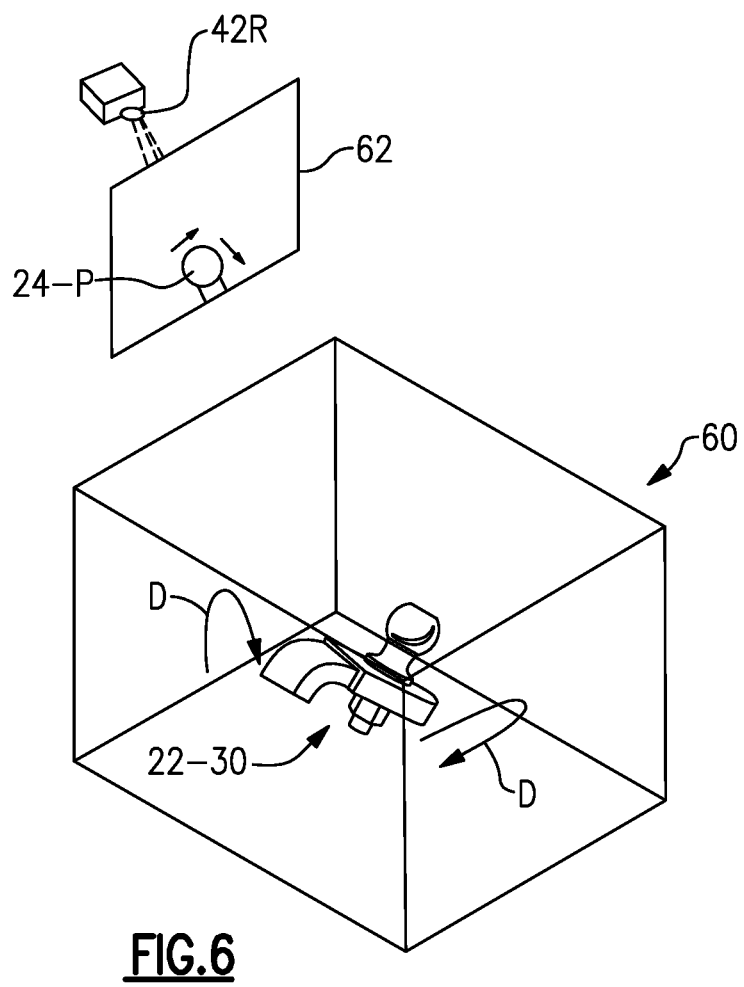
FIG. 6 illustrates positioning a model tow hitch in a three-dimensional rendering.

When the model of the tow hitch 22 has been identified or the parameters defining the tow hitch 22 have been entered into the controller 30, the controller 30 produces a three-dimensional model tow hitch 22-3D based on the information or parameters for the tow hitch 22 identified above by the controller 30 (step 120). The controller 30 can then create the three-dimensional rendering 60 of the scene surrounding the tow hitch 22 (step 130) by using camera extrinsic/intrinsic data, a plane of the ground segment 32, and the model tow hitch 22-3D. The controller 30 may assume that the ground segment 32 is flat and that the tow hitch 22 is within the field of the camera 28. As shown in FIG. 6, the focal point 42 of the camera 28 is also generated relative to the three-dimensional rendering 60. The focal point 42 may be within the three-dimensional rendering 60, or located outside of the three-dimensional rendering 60.

Once the controller 30 has constructed the three-dimensional rendering 60 including the model tow hitch 22-3D, the controller 30 must position the model tow hitch 22-3D in the three-dimensional rendering 60 (step 140). With the model tow hitch 22-3D in the three-dimensional rendering 60, the model tow hitch 22-3D is orientated such that it corresponds to the orientation of the tow hitch 22 in the three-dimensional scene 44 when attached to the vehicle 20. The controller 30 is able to position the model tow hitch 22-3D in a number of different directions D, such as rotationally or translationally.

The controller 30 optimizes the position of the model tow hitch 22-3D until the model tow hitch 22-3D captured in a two-dimensional projection 62 (See tow hitch projection 22-P) from the three-dimensional rendering 60 matches the image 40 captured by the camera 28 of the tow hitch 22. Therefore, movement of the model tow hitch 22-3D in the three-dimensional rendering 60 changes tow hitch projection 24-P in the two-dimensional projection 62 until the two-dimensional projection 62 and the image 40 match within a predetermined amount of error.

Once the three-dimensional rendering 60 is complete, the controller 30 can determine a distance between the camera 28 and the ball 26 and a distance between the ball 26 and the ground segment 32. One feature of creating the three-dimensional model tow hitch 22-3D, is the ability for the controller 30 or another system on the vehicle to use the three-dimensional rendering 60 for maneuvering a trailer or monitoring a distance between elements in the three-dimensional rendering 60.

The two-dimensional projection 62 is created through the creation of the focal point 42 of the camera 28 relative to the three-dimensional rendering 60. This creates a view similar to the view the camera 28 produces when positioned relative to the three-dimensional scene 44. Therefore, the two-dimensional projection 62 is attempting to recreate the two-dimensional image 40 but with the three-dimensional rendering 60. One feature of this approach is the ability to compare the two-dimensional image 40 and the two-dimensional projection 62 as a way of validating the position of the model tow hitch 22-3D in the three-dimensional rendering 60.

It should be understood that like reference numerals identify corresponding or similar elements throughout the several drawings. It should also be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claim should be studied to determine the true scope and content of this disclosure.

What is claimed is:

1. A method of determining a tow hitch position, the method comprising:
   obtaining, by a processor, a two-dimensional image, captured by a camera to which the processor is in electrical communication and which is mounted to a vehicle, of a tow hitch of the vehicle in a three-dimensional scene;
   obtaining, by the processor, a model tow hitch in three dimensions;
   generating, by the processor, a three-dimensional rendering of a scene that includes the model tow hitch;
   positioning, by the processor, the model tow hitch in the three-dimensional rendering in an orientation corresponding with an orientation of the tow hitch in the three-dimensional scene;
   determining, by the processor, at least one of a distance between the camera and a ball of the tow hitch or a distance between the ball and a ground surface using the three-dimensional rendering; and
   sending, by the processor to a system of the vehicle for performing a trailer assist operation, the at least one of the determined distance between the camera and the ball of the tow hitch or the determined distance between the ball and the ground surface,
   wherein obtaining the model tow hitch in three dimensions includes selecting the predefined tow hitch from a database of predefined tow hitches, selecting the predefined tow hitch from the database includes comparing, by the processor, the two-dimensional image of the tow hitch with invariant features of predefined tow hitches in the database, and the invariant features comprise histogram of oriented gradients, and
   wherein generating the three-dimensional rendering of the scene includes utilizing, by the processor, camera extrinsic data, camera intrinsic data, a plane of a ground segment, and the model tow hitch.

2. The method of claim 1, wherein the model tow hitch corresponds to the tow hitch.

3. The method of claim 2, wherein the model tow hitch and the tow hitch include at least one of a matching tow hitch drop, a ball diameter, or a distance from a receiver.

4. The method of claim 1, wherein the two-dimensional image of the tow hitch is captured by the camera.

5. The method of claim 1, wherein obtaining the model tow hitch in three-dimensions includes receiving, by the processor, inputs directed to design parameters of the tow hitch for generating the model of the tow hitch in three dimensions.

6. The method of claim 1, wherein the three-dimensional rendering identifies a model camera focal point that corresponds in three-dimensional space to a focal point of the camera used for obtaining the two-dimensional image of the tow hitch.

7. The method of claim 6 wherein positioning the model tow hitch includes generating, by the processor, a two-dimensional projection of the model tow hitch from the model camera focal point and comparing, by the processor, the two-dimensional projection with the two-dimensional image.

8. The method of claim 7, wherein the model tow hitch is properly positioned when the two-dimensional projection of the model tow hitch matches the two-dimensional image of the tow hitch.

9. The method of claim 1, further comprising receiving one or more user-provided insert parameters defining the tow hitch, and the three-dimensional rendering of the scene is generated based on the one or more user-provided insert parameters, the one or more user-provided insert parameters defining the tow hitch comprises at least one of tow hitch drop, tow hitch ball size or tow hitch distance from a receiver of the vehicle.

10. The method of claim 1, wherein generating the three-dimensional rendering comprises generating a focal point of the camera within the three-dimensional rendering.

11. The method of claim 1, wherein generating the three-dimensional rendering comprises generating a focal point of the camera outside of the three-dimensional rendering.

12. A trailer hitch assisting assembly comprising:
   a camera mounted to a vehicle for capturing images of a tow hitch of the vehicle; and
   a controller in electrical communication with the camera, the controller configured to:
      obtain, from the camera, a two-dimensional image of a tow hitch in a three-dimensional scene;
      obtain a model tow hitch in three dimensions;

generate a three-dimensional rendering of a scene that includes the model tow hitch; and position the model tow hitch in the three-dimensional rendering in an orientation corresponding with an orientation of the tow hitch in the three-dimensional scene;

determine at least one of a distance between the camera and a ball of the tow hitch, or a distance between the ball and a ground surface based upon the three-dimensional rendering; and maneuver the vehicle during a trailer hitch assist operation based upon the at least one of the determined distance between the camera and the ball of the tow hitch or the determined distance between the ball of the tow hitch and the ground surface, wherein the controller obtains the model tow hitch in three dimensions in part by receiving a user selection of a predefined tow hitch from a database of predefined tow hitches, the predefined tow hitch selected by the user without the controller selecting the predefined tow hitch using user-provided dimension or distance information relating to the tow hitch, and wherein generating the three-dimensional rendering includes utilizing camera extrinsic data, camera intrinsic data, a plane of a ground segment, and the model tow hitch.

13. The assembly of claim 12, wherein the model tow hitch and the tow hitch include at least one of a matching tow hitch drop, a ball diameter, or a distance from a receiver.

14. The assembly of claim 12, wherein the two-dimensional image of the tow hitch is captured by the camera.

15. The assembly of claimer 12, wherein the three-dimensional rendering identifies a model camera focal point that corresponds in three-dimensional space to a focal point of the camera used for obtaining the two-dimensional image of the tow hitch.

16. The assembly of claim 15, wherein positioning the model tow hitch includes generating a two-dimensional projection of the model tow hitch from the model camera focal point and comparing the two-dimensional projection with the two-dimensional image and the model tow hitch is properly positioned when the two-dimensional projection of the model tow hitch matches the two-dimensional image of the tow hitch.

17. The assembly of claim 12, further comprising receiving one or more user-provided insert parameters defining the tow hitch and the three-dimensional rendering of the scene is generated based on the one or more user-provided insert parameters.

18. The assembly of claim 17, wherein the one or more user-provided insert parameters defining the tow hitch comprises at least one of tow hitch drop, tow hitch ball size or tow hitch distance from a receiver of the vehicle.

19. The assembly of claim 12, wherein each predefined tow hitch in the database includes at least one parameter, and the controller is configured to obtain the model tow hitch in three dimensions based at least partly upon the at least one parameter of the predefined tow hitch selected from the database.

20. The assembly of claim 12, wherein the model tow hitch in three dimensions comprises the predefined tow hitch selected.

21. A method of performing a trailer hitch assist operation, the method comprising:

obtaining, by a processor, a two-dimensional image, captured by a camera to which the processor is in electrical communication and which is mounted to a vehicle, of a tow hitch of the vehicle in a three-dimensional scene;

obtaining, by the processor, a model tow hitch in three dimensions;

generating, by the processor, a three-dimensional rendering of a scene that includes the model tow hitch;

positioning, by the processor, the model tow hitch in the three-dimensional rendering in an orientation corresponding with an orientation of the tow hitch in the three-dimensional scene;

determining, by the processor, at least one of a distance between the camera and a ball of the tow hitch, or a distance between the ball and a ground surface based upon the three-dimensional rendering; and maneuvering the vehicle during a trailer hitch assist operation based upon the at least one of the determined distance between the camera and the ball of the tow hitch or the determined distance between the ball of the tow hitch and the ground surface, wherein the controller obtains the model tow hitch in three dimensions in part by receiving a user selection of the a predefined tow hitch from a database of predefined tow hitches, the predefined tow hitch selected by the user without the controller selecting the predefined tow hitch using user-provided dimension or distance information relating to the tow hitch, and wherein generating the three-dimensional rendering includes utilizing camera extrinsic data, camera intrinsic data, a plane of a ground segment, and the model tow hitch.

22. The method of claim 21, further comprising receiving one or more user-provided insert parameters defining the tow hitch and the three-dimensional rendering of the scene is generated based on the one or more user-provided insert parameters.

23. The method of claim 22, wherein the one or more user-provided insert parameters defining the tow hitch comprises at least one of tow hitch drop, tow hitch ball size or tow hitch distance from a receiver of the vehicle.

* * * * *